V. SZÜCS.
CLUTCH MECHANISM.
APPLICATION FILED JULY 13, 1909.

937,556.

Patented Oct. 19, 1909.

2 SHEETS—SHEET 1.

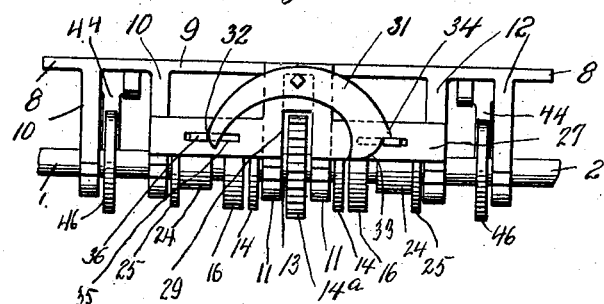
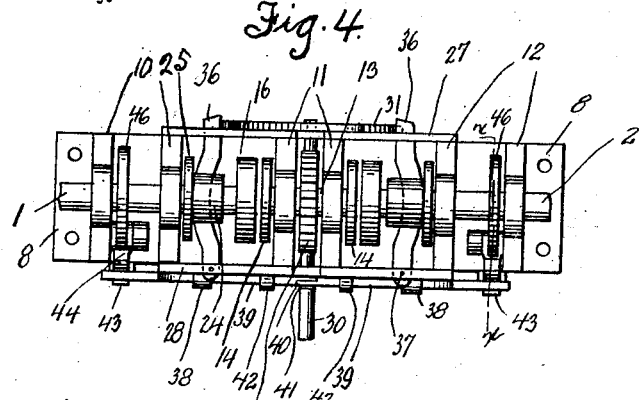
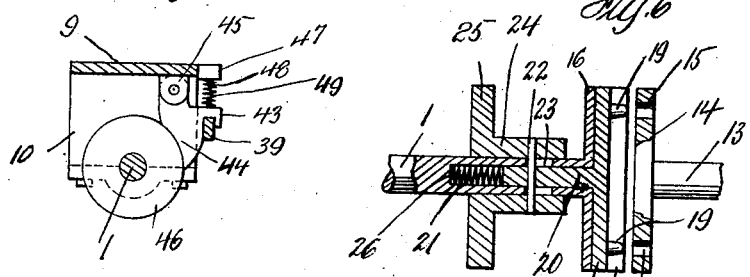
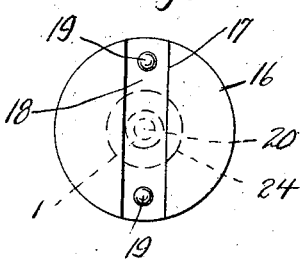

UNITED STATES PATENT OFFICE.

VINCZENT SZÜCS, OF BARBERTON, OHIO.

CLUTCH MECHANISM.

937,556.  Specification of Letters Patent.  Patented Oct. 19, 1909.

Application filed July 13, 1909. Serial No. 507,303.

*To all whom it may concern:*

Be it known that I, VINCZENT SZÜCS. a citizen of the United States of America, residing at Barberton, in the county of Summit and State of Ohio, have invented certain new and useful Improvements in Clutch Mechanisms, of which the following is a specification, reference being had therein to the accompanying drawing.

This invention relates to clutch mechanisms for automobiles, and the invention has for its primary object to provide a clutch mechanism in connection with the driven axle of an automobile for controlling the operation of the same, said mechanism being compact and of a durable construction, easily maintained in an operative condition, and manipulated from the driver's seat of the automobile.

Another object of this invention is to provide a clutch mechanism that will simultaneously disconnect the rear axle of an automobile with the power and apply the brakes of the automobile to cause a cessation in the operation of the same immediately upon the rear axle thereof being disconnected relative to the power.

With the above and other objects in view which will more readily appear as the invention is better understood, the same consists in the novel construction, combination and arrangement of parts to be hereinafter described and then claimed.

Figure 1:
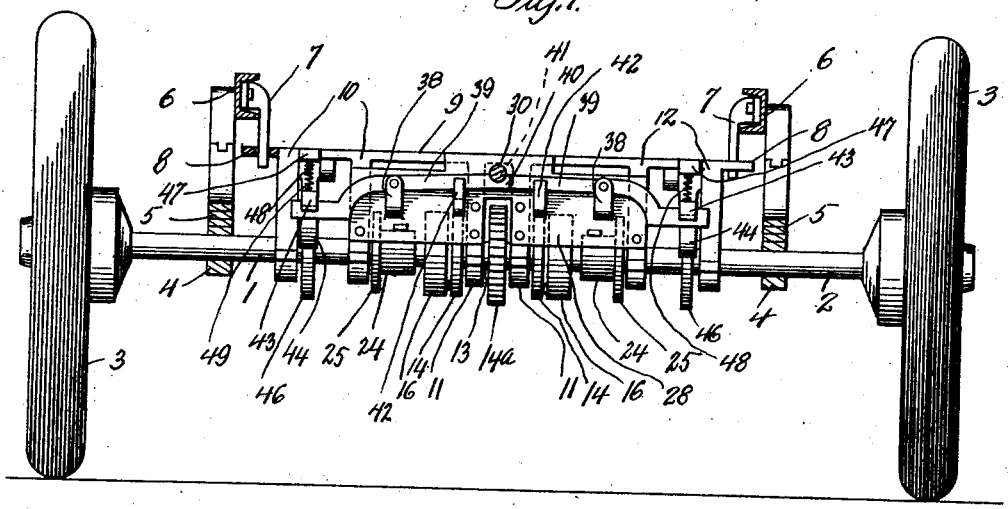
Figure 2:
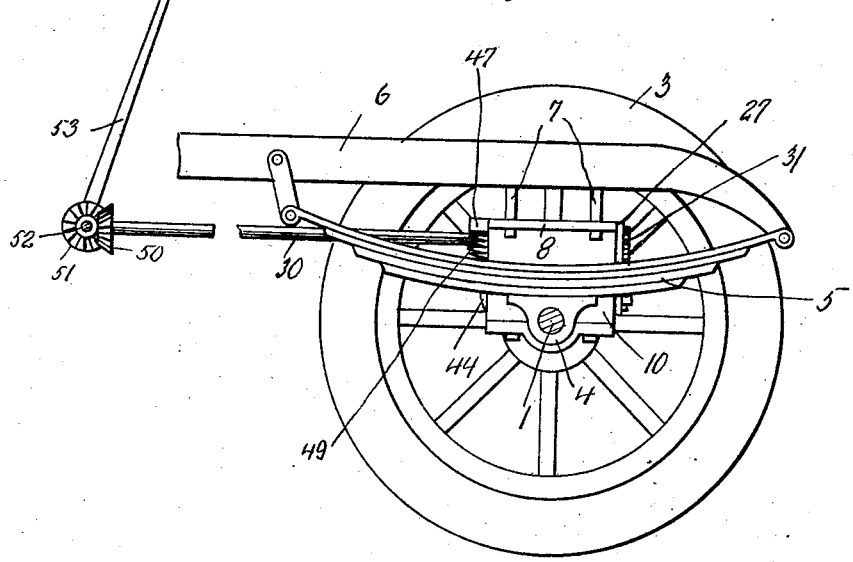

In the drawings: Figure 1 is a front elevation of the rear axle of an automobile illustrating the clutch mechanism in connection therewith, Fig. 2 is a cross sectional view of the rear axle of the automobile showing an end view of the clutch mechanism, Fig. 3 is a rear elevation of the clutch mechanism, Fig. 4 is a bottom plan of the same, Fig. 5 is a cross sectional view of the clutch mechanism taken on the line *x*—*x* of Fig. 4, Fig. 6 is an enlarged longitudinal sectional view of a portion of the clutch mechanism, and Fig. 7 is an end view of one of the clutch members.

To put my invention into practice, I provide an automobile with a rear axle comprising two revoluble sections 1 and 2, these sections longitudinally alining as if the axle was one piece. Upon the outer ends of the axle sections 1 and 2 are mounted rear wheels 3 of the automobile, and adjacent to said wheels are bearings 4 supporting springs 5, which are yieldably connected to the longitudinal frame 6 of the automobile. The confronting sides of the frame 6 directly above the axle sections 1 and 2 are provided with depending guides 7 extending through apertured extensions 8 of a transverse frame 9, said frame having depending sets of bearings 10, 11 and 12, the bearings 10 and 12 being located at the ends of the frame 9, while the bearings 11 are arranged intermediate the ends of said frame. The bearings 10 and 12 are loosely connected to the axle sections 1 and 2, while the bearings 11 support a revoluble shaft 13 longitudinally alining with the axle sections 1 and 2 between the confronting ends of said sections. This shaft 13 is provided with a gear or sprocket wheel 14$^a$, and said shaft is adapted to be revolved by a suitable source of power carried by the automobile. The ends of the shaft 13 are provided with clutch members 14 having diametrically opposed openings 15. The inner ends of the axle sections 1 and 2 are provided with disks 16 having transverse grooves 17 for clutch members 18, said clutch members having oppositely disposed teats 19 adapted to enter the openings 15 of the clutch members 14. The clutch members 18 conform to bars fitting in the grooves 17, said bars having central inwardly extending shanks 20, slidably mounted in longitudinal bores 21 provided therefor in the ends of the axle sections 1 and 2. The shanks 20 are connected by pins 22 to the hubs 24 of the actuating members 25 which are slidably mounted upon the axle sections 1 and 2. Each axle section has the wall of its bore provided with elongated alining slots 23 through which extends a pin 22.

Coil springs 26 are located in the inner ends of the bores 21 to bear against the ends of the shanks 20, and these springs are employed for moving the clutch members 18 relative to the axle sections 1 and 2, when released by the actuating members 25.

Connected to the front and rear sides of the bearings 11 and innermost bearings 10 and 12 are plates 27 and 28, said plates being provided with central vertical slots 29 providing clearance for the transmission to the shaft 13. Journaled in these plates is a longitudinal shaft 30, and upon the rear end of said shaft is fixed a crescent-shaped cam member 31 having beveled ends 32 and 33, the latter having a stop lug 34, for a purpose that will presently appear.

The plates 27 and 28 are provided with oppositely disposed slots 35 for longitudinal actuating levers 36, said levers having the forward ends thereof pivotally mounted in the slots of the plate 28 by means of pins 37. The actuating levers extend over the hubs 24 and engage the actuating members 25. The free ends of said levers are adapted to be engaged by the beveled ends 32 and 33 of the cam 31, whereby when the shaft 30 is partially rotated and the beveled ends 32 and 33 placed in engagement with the free ends of the levers 36, said levers will be simultaneously moved to shift the actuating members 25 and move the clutch members 18 into engagement with the clutch members 14. The stop lug 34 limits the locking movement of the cam 31 and is adapted to hold the cam whereby the vibrations or jarring of the automobile when in operation will not dislodge the cam relative to the lever 36 and release the clutch members 18.

The front plate 28 is provided with brackets 38 for pivoted levers 39, having the confronting ends thereof overlapped, as at 40. The shaft 30 is cut away, as at 41, to provide clearance for the overlapped ends of said levers when the shaft 30 is in one position, said shaft when rotating to another position depressing the overlapped ends of said levers. The inner or overlapped ends of the levers 39 are limited in their downward movement by projections 42 carried by the plate 28.

The outer ends of the levers 39 extend under projections 43 of brake shoes 44 movably suspended, as at 45, from the frame 9. These brake shoes are located between each set of bearings 10 and 12 and are adapted to engage brake wheels 46 mounted upon the axle sections 1 and 2. To swing the brake shoes into engagement with the brake wheels 46, the frame 9 is provided upon the front side directly above the projections 43 of the shoes 44 with lugs 47, and the confronting faces of said lugs and the projections 43 are provided with teats 48 for maintaining vertical coil springs 49 between said lugs and said projections, the tension of these springs being sufficient to frictionally hold the brake shoes 44 in engagement with the brake wheels 46, and retard the movement of the axle sections 1 and 2, when the clutch members 18 are moved out of engagement with the clutch members 15.

The shaft 30 is adapted to extend forward beneath the body of the automobile to the operator's seat thereof, where the shaft is provided with a beveled gear wheel 50 meshing with a beveled gear wheel 51 mounted upon a revoluble shaft 52 having one end thereof provided with a lever 53. This shaft operating mechanism is of a conventional form, and I reserve the right to employ any mechanism that can be actuated by a lever for rotating the shaft 30.

From the foregoing description taken in connection with the drawings, it will be observed that the shaft 30 serves two functions, namely, that of controlling the connection between the axle sections 1 and 2 and the shaft 13, and that of releasing the brake shoes 44, whereby the springs 49 can force said shoes into frictional engagement with the wheel 46 and retard the movement of the axle sections 1 and 2. With the cam 31 properly positioned with relation to the cut away portion 41 of the shaft 30, the overlapping ends of the levers 39 will be simultaneously released to allow the brake shoes 44 to set, while the levers 37 move the clutch members 18 out of engagement with the clutch members 14. With the shaft 13 revolving and the clutch members 18 released, said members will immediately engage the clutch members 14 and the teats 19 of the clutch members 18 enter the openings 15 upon said openings alining with said teats.

While in the drawings there is illustrated the preferred embodiment of the invention, it is to be understood that the structural elements thereof can be varied or changed as to the size, shape and manner of assemblage without departing from the spirit and scope of the invention.

Having now described my invention what I claim as new, is:—

1. In a clutch mechanism for automobiles, the combination with a sectional axle, and a driven shaft interposed between the sections of said axle, of clutch members carried by the ends of said driven shaft, movable clutch members carried by the inner ends of said axle sections and adapted to engage the clutch members of said shaft to rotate with said members, actuating members slidably mounted upon said axle sections for moving the clutch members thereof, horizontal levers for engaging said actuating members, a cam for moving said levers in unison, a rotatable shaft supporting said cam and adapted to be rotated from the driver's seat of an automobile, brake wheels carried by said axle sections, brake shoes adapted to engage said brake wheels, and means actuated by said shaft to set said brake shoes simultaneously with the release of said clutch members.

2. In a clutch mechanism for automobiles, the combination with a sectional axle, a driven shaft interposed between the inner ends of the sections of said axle, of a frame supported by the sections of said axle, clutch members carried by the ends of said driven shaft, movable clutch members carried by the ends of the sections of said axle and adapted to engage the clutch members of said shaft, actuating members carried by the sections of said axle for moving the clutch members thereof, plates carried by the front and rear sides of said frame, actuating levers pivotally connected to one of said plates and extending through the other of said plates, said actuating levers being adapted to move said actuating members, a longitudinal rotatable shaft journaled in said plates, a cam carried by the rear end of said shaft for moving the free ends of said levers, and means carried by one of said plates and actuated by said shaft for retarding the movement of the sections of said axle when said clutch members are released.

3. In a clutch mechanism for automobiles, the combination with an axle consisting of two sections, and a driven shaft interposed between the sections of said axle, of clutch members carried by said shaft, movable clutch members carried by the sections of said axle and adapted to be moved into engagement with the clutch members of said shaft, horizontal levers supported by the sections of said axle for moving the clutch members thereof, a longitudinal shaft, a cam carried by said shaft for moving said levers, and means actuated by said shaft for retarding the movement of the sections of said axle when the clutch members are released.

In testimony whereof I affix my signature in the presence of two witnesses.

VINCZENT SZÜCS.

Witnesses:
   Chas. Ammerman,
   Mike Tunansky.